United States Patent
Kfir

(10) Patent No.: US 7,346,081 B2
(45) Date of Patent: Mar. 18, 2008

(54) TRAFFIC HANDLING IN A PROTECTED SYNCHRONOUS COMMUNICATION NETWORK

(75) Inventor: Asher Kfir, Givat Shmuel (IL)

(73) Assignee: ECI Telecom Ltd., Petach Tikva (IL)

( * ) Notice: Subject to any disclaimer, the term of this patent is extended or adjusted under 35 U.S.C. 154(b) by 1110 days.

(21) Appl. No.: 10/358,379

(22) Filed: Feb. 5, 2003

(65) Prior Publication Data

US 2004/0076176 A1    Apr. 22, 2004

(30) Foreign Application Priority Data

Oct. 16, 2002    (IL) .................................. 152314

(51) Int. Cl.
 *H04L 12/56* (2006.01)
(52) U.S. Cl. ....................... 370/537; 370/907
(58) Field of Classification Search ............... 370/216, 370/225, 535, 536, 537, 538, 539, 907
 See application file for complete search history.

(56) References Cited

U.S. PATENT DOCUMENTS

| | | |
|---|---|---|
| 5,465,252 A | 11/1995 | Muller |
| 5,717,693 A | 2/1998 | Baydar |
| 5,917,824 A | 6/1999 | Brueckheimer et al. |
| 2002/0037013 A1 | 3/2002 | Grammel |
| 2002/0037019 A1 | 3/2002 | Heuer |
| 2002/0126712 A1 | 9/2002 | Mueller |
| 2002/0181479 A1* | 12/2002 | Okuno ..................... 370/404 |
| 2003/0202540 A1 | 10/2003 | Kfir et al. |

FOREIGN PATENT DOCUMENTS

| | | |
|---|---|---|
| DE | 1058149 | 6/2000 |
| DE | 4104238 | 6/2000 |
| DE | 10056220 | 6/2000 |
| DE | 69504337 | 6/2000 |
| EP | 1011220 | 6/2000 |
| EP | 1 357 688 A | 10/2003 |
| WO | WO99/56421 | 11/1999 |

OTHER PUBLICATIONS

T1X1.5/2000-157R1 dated Jul. 10-14, 2000 "A Justification for a Variable Bandwidth Allocation Methodology for SONET Virtually Concatenated SPEs" N. Jones and T. Wilson.

(Continued)

*Primary Examiner*—Derrick W. Ferris
(74) *Attorney, Agent, or Firm*—Browdy and Neimark, PLLC

(57) ABSTRACT

A method for dynamically adding a new channel to a group of virtually concatenated channels carrying traffic to a network element (NE) of a synchronous network. By this method if a delay associated with the new channel is longer than a delay associated with the group of virtually concatenated channels then traffic received along the group of virtually concatenated channels is delayed until the group of virtually concatenated channels and the new channel are time-aligned, and then the new channel is added to the group. If the delay associated with the new channel is shorter than the delay associated with the group of virtually concatenated channels then traffic in the new channel is delayed until the new channel and the group of virtually concatenated channels are time-aligned, and then the new channel will be added to the group.

17 Claims, 2 Drawing Sheets

OTHER PUBLICATIONS

T1X1.5/99-098 dated Apr. 9, 1999 "Higher Order SONET Virtual Concatenation" N. Jones, et al.

T1X1.5/2000-199 Dated Oct. 9-13, 2000; "A Proposed Link Capacity Adjustment Scheme (LCAS) for SONET Virtually Concatenated SPEs" N. Jones et al.

The Communications Handbook, CRC Press & IEEE Press, 1997, Editor-in-Chief Jerry D. Gibson: Chapters 39 and 40, pp. 542-564.

L. Choy; XP-001096527- Virtual Concentration Tutorial: Enhancing SONET/SDH Networks for Data Transport; Jan. 2002, vol. 1, No. 1, Journal of Optical Networking.

N. Jones et al., XP-001019384; T1X1.5/2000-199; Contribution to T1 Standards Project-T1X1.5; A Proposed Link Capacity Adjustment Scheme (LCAS) for SONET Virtually Concatenated SPEs; Lucas Technologies; Oct. 9-13, 2000.

XP-002216519; G.7042/Y.1305, Nov. 2001; International Telecommunications Union (ITU-T); Link Capacity Adjustment Scheme (LCAS) for Virtual Conatenated Signals.

Rajendra Damle et al; "Need for concatenating optical channels to create a transparent high bandwidth channels"; *Contribution for T1 Standards Project*, Mar. 26, 2001, pp. 1-6.

* cited by examiner

TRAFFIC HANDLING IN A PROTECTED SYNCHRONOUS COMMUNICATION NETWORK

FIELD OF THE INVENTION

The present invention relates generally to synchronous communication networks and more particularly to virtual concatenation in synchronous communication networks.

BACKGROUND OF THE INVENTION

Virtual concatenation is used today in synchronous communication networks, such as Synchronous Optical Network (SONET) based networks or Synchronous Digital Hierarchy (SDH) based networks, to combine multiple synchronous channels carrying low rate payload into a single synchronous channel carrying high rate payload. A mechanism to enable dynamic virtual concatenation for increasing or decreasing capacity of a link without service affecting is developed today under the Link Capacity Adjustment Scheme (LCAS).

However, there are still several problems that are not addressed by LCAS. For example, Applicants' unpublished pending Israel Patent Application IL 149,323 filed on Apr. 24, 2002 addresses one such problem of dynamically adding channels to and removing channels from a group of virtually concatenated channels in cases where network delays associated with the channels to be added and removed are different from network delays associated with the group.

Another problem that is not addressed by LCAS is enabling of dynamic application of changes to a group of virtually concatenated channels in communication systems that support protection mechanisms. Solutions to such a problem are considered as highly desired.

Some aspects of technologies and related art that may be useful in understanding the present invention are described in the following publications:

a contribution T1X1.5/2000-157R1 dated Jul. 10-14, 2000 of Lucent Technologies to the T1 Standards Project—T1X1.5 which proposes a justification for a variable bandwidth allocation (VBA) methodology for SONET virtually concatenated SPEs (SPE—Synchronous Payload Envelope);

a contribution T1X1.5/1999-098 dated Apr. 9, 1999 of Lucent Technologies to the T1 Standards Project T1X1.5 which describes higher order SONET virtual concatenation;

a contribution T1X1.5/2000-199 dated Oct. 9-13, 2000 of Lucent Technologies to the T1 Standards Project—T1X1.5 which describes a proposed link capacity adjustment scheme (LCAS) for SONET virtually concatenated SPEs; and the following chapters in *The Communications Handbook*, CRC Press & IEEE Press, 1997, Editor-in-Chief Jerry D. Gibson: Chapter 39 on pages 542-553, and Chapter 40 on pages 554-564.

The disclosures of all references mentioned above and throughout the present specification are hereby incorporated herein by reference.

SUMMARY OF THE INVENTION

The present invention seeks to provide methods and apparatus that enable dynamic application of changes to a group of virtually concatenated channels in communication systems that also support protection mechanisms.

Further objects and features of the invention will become apparent to those skilled in the art from the following description and the accompanying drawings.

There is thus provided in accordance with a preferred embodiment of the present invention a method for enabling communication between a first network element (NE) and a second NE of a synchronous network which method is adapted to support dynamic application of changes to an aligned group of virtually concatenated channels carrying communication traffic between the first NE and the second NE, the method comprising:

distinguishing between a first mode of time aligning the group of virtually concatenated channels following the addition of a new channel to the group in response to a failure event occurring in at least one of the channels belonging to the group, or following a detection that at least one of the previously aligned channels is not aligned with the remaining channels of the group and a between second mode of time aligning said group when a new channel is added to the group or a selected channel is removed from the group in response to a request transmitted by a managing element, wherein in the first mode, the time alignment is performed without using any pointer justification action regardless of network delays associated with the group's channels, and in the second mode, if a network delay associated with a new channel to be added to the group of virtually concatenated channels is longer than a network delay associated with the group, the time alignment of the new channel and the group is achieved by using at least one pointer justification action.

Preferably, if a network delay associated with a channel selected to be removed from the group of virtually concatenated channels is longer than a network delay associated with the group excluding the selected channel, the time alignment of the channels in the group other than the selected channel, is carried out by using at least one pointer justification action.

According to a preferred embodiment of the invention, the distinguishing step comprises:

monitoring the communication traffic carried along the group to obtain an indication that refers to the operability status of at least one channel in the group; and determining the mode of time alignment to be carried based on information retrieved from that indication.

In accordance with yet another embodiment of the invention, the distinguishing step comprises:

monitoring the communication traffic carried along the group to obtain a request from a managing element that refers to an addition or a removal of at least one channel to or from the group of virtually concatenated channels.

According to still another embodiment, the indication comprises at least one alarm signal.

By yet another embodiment of the invention, the distinguishing step comprises the step of determining that addition of a new channel to the group is made according to the first mode if the new channel comprises a backup channel.

In accordance with another embodiment, in the first mode, the at least one of the channels in the group in which the failure event occurs, carries communication payload comprised in said communication traffic. Preferably, In accordance with another embodiment, when the second mode of the method provided is applied, the at least one pointer justification action is used before adding a new channel to the group if a network delay associated with the new channel is longer than a network delay associated with the group, comprises at least one positive pointer justification action.

Preferably, the at least one pointer justification action used following removal of a selected channel from the group in accordance with the second mode and in the case that a network delay associated with the group excluding the selected channel is shorter than a network delay associated with the selected channel, comprises at least one negative pointer justification action.

By another aspect of the invention there is provided an apparatus for enabling communication between a first network element (NE) and a second NE of a synchronous network which is adapted to support dynamic application of changes to an aligned group of virtually concatenated channels carrying communication traffic between said first NE and said second NE, the apparatus comprising:

a synchronous processor operative to receive the communication traffic carried along the group of virtually concatenated channels; and a controller operatively associated with the synchronous processor and operative to control the synchronous processor for distinguishing between a first mode of changing the group in which a new channel is added to the group in response to occurrence of a failure event in at least one of the channels in the group, and a second mode of changing the group in which a new channel is added to the group or a selected channel is removed from the group not in response to occurrence of such a failure event, wherein in said first mode, the synchronous processor is operative under control of the controller to perform time alignment of the new channel and the group without using any pointer justification action regardless of network delays associated with the new channel and the group, and in the second mode, if a network delay associated with a new channel to be added to the group of virtually concatenated channels is longer than a network delay associated with said group, the addition of the new channel to the group is performed by the synchronous processor after time aligning the new channel and the group by using at least one pointer justification action.

Preferably, in the second mode, if a network delay associated with a channel selected to be removed from said group of virtually concatenated channels is longer than a network delay associated with said group excluding the selected channel, the removal of the selected channel from the group is performed by the synchronous processor by using at least one pointer justification action.

By another embodiment, in the first mode, the synchronous processor is operative under control of the controller to perform a hit process to achieve time alignment of the new channel and the group.

In accordance with another embodiment, the controller is operative to distinguish between the two modes of operation by monitoring the communication traffic carried along the group to obtain an indication that refers to the operability status of at least one channel in the group, and determining the mode of time alignment to be carried based on information retrieved from that indication.

In accordance with yet another embodiment there is provided an apparatus for enabling communication between a first network element (NE) and a second NE of a synchronous network which is adapted to support dynamic application of changes to a group of virtually concatenated channels carrying communication traffic between the first NE and the second NE, the apparatus comprising:

a mapper/demapper unit operative to receive said communication traffic carried along said group of virtually concatenated channels; and a controller operatively associated with the mapper/demapper unit and operative to control the mapper/demapper unit for distinguishing between a first mode of changing the group in which a new channel is added to the group in response to occurrence of a failure event in at least part of one of the channels associated with the group, and a second mode of affecting a change in the group by which a new channel is added to the group or a selected channel is removed from the group in response to a management request, wherein in the first mode, when a new channel is to be added to the group, the mapper/demapper unit is operative under control of the controller to perform time alignment of the new channel and the group without using any pointer justification action regardless of network delays associated with the new channel and the group, and in the second mode, addition of a new channel to the group, if a network delay associated with the new channel is longer than a network delay associated with the group, is performed by the mapper/demapper unit after achieving time alignment of the new channel and the group by using at least one pointer justification action, and removal of a selected channel from the group, if a network delay associated with the group excluding the selected channel is shorter than a network delay associated with the selected channel, is followed by performance by the mapper/demapper unit of time alignment of channels in the group other than the selected channel by using at least one pointer justification action.

By still another aspect of the invention there is provided a network element (NE) operative in a synchronous network (e.g. SONET network or SDH network), which comprises an apparatus as described above.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
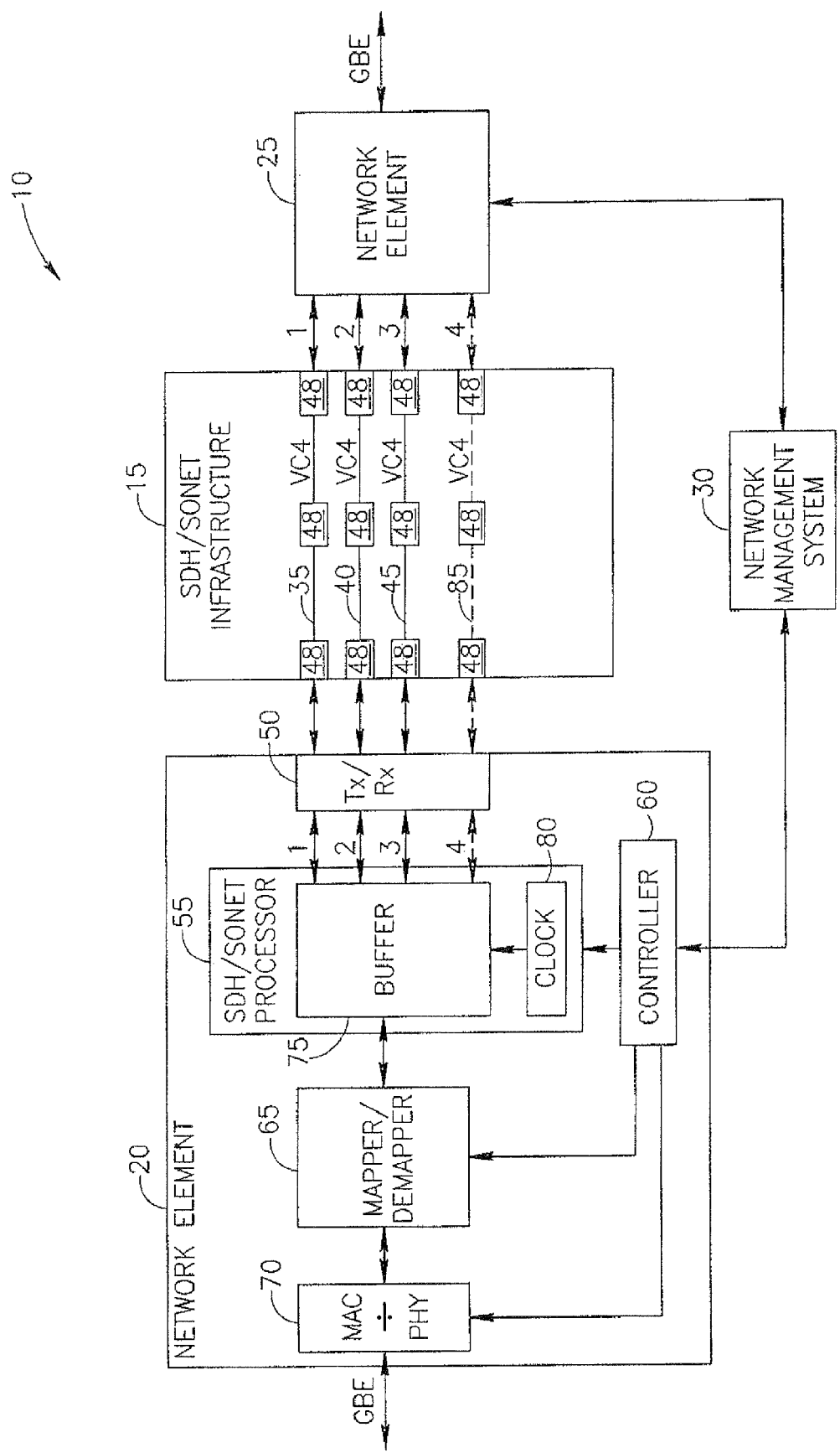
FIG. 1 is a simplified block diagram illustration of a preferred implementation of a synchronous communication network constructed and operative in accordance with a preferred embodiment of the present invention.

Reference is now made to FIG. 1 which is a simplified block diagram illustration of a preferred implementation of a synchronous communication network 10 constructed and operative in accordance with a preferred embodiment of the present invention.

The synchronous communication network 10 may preferably include at least one of the following: a network based on the Synchronous Optical Network (SONET); and a network based on the Synchronous Digital Hierarchy (SDH).

Preferably, the network 10 includes a plurality of network elements (NEs) that communicate with each other via synchronous infrastructure 15. The plurality of NEs may include, for example, routers/switches that communicate with each other via the synchronous infrastructure 15 in a synchronous format, and with network terminals in a synchronous format or another format, such as an Ethernet format.

By way of example, two NEs, indicated by reference numerals 20 and 25, are depicted in FIG. 1. Network Element ("NE") 20 and NE 25 enable communication between network terminals associated therewith (not shown) over the synchronous infrastructure 15 under control of a network management system 30 that is operatively associated with NE 20, NE 25 and the synchronous infrastructure 15. Alternatively, NE 20 and NE 25 may be separately managed by separate management systems (not shown).

Further by way of example, and without limiting the generality of the description, the network 10 in FIG. 1 is arranged as an Ethernet-over-synchronous network in which NEs 20 and 25 communicate with the network terminals associated therewith in an Ethernet format, such as a Gigabit Ethernet (GBE) format. It is however appreciated that the present invention is not limited by a communication format used in communication between each NE and its associated network terminal.

Preferably, NE 20 and NE 25 employ virtual concatenation in communication over the synchronous infrastructure 15. In such a case, communication between NE 20 and NE 25 is carried out over a plurality of individual channels, each passing via the synchronous infrastructure 15, and the number of individual channels over which the communication between the NE 20 and the NE 25 is carried out may change from time to time. Each of the plurality of individual channels may preferably be represented by one virtual container (VC). The VC may be either a higher order (HO) VC or a lower order (LO) VC. The higher order VC may include a VC-4 or a VC-3. The lower order VC may include one of the following: a VC-11; a VC-12; and a VC-2. It is appreciated that many channels may use the same route.

Preferably, the number of individual channels over which communication between NE 20 and NE 25 is carried out may vary dynamically without service affecting to comply with LCAS. By way of example, FIG. 1 depicts a group of three virtually concatenated channels, indicated by reference numerals 35, 40 and 45, over which communication between NE 20 and NE 25 is carried out during an arbitrary time period. Further by way of example, and without limiting the generality of the description, the channels 35, 40 and 45 are VC4 channels. It is however appreciated that the present invention is not limited by the number of virtually concatenated channels over which communication between NE 20 and NE 25 is carried out, or, in a case where the channels are VC channels, a VC type of the VC channels.

In the example shown, at least one of the channels 35, 40 and 45, e.g. channel 45, is a protected channel. The term "protected channel" as used herein, refers to an active channel that is backed up by a backup channel. In case of a failure occurring in the traffic-carrying channel, traffic is diverted to the backup (protecting) channel. Two typical types of protection are known to be used. Either the failing channel is fully replaced by the backup channel, or the failing channel is protected "in parts" which means that only part of the original channel (the part that comprises the failing section) is replaced by a backup channel, while the rest of the protected channel remains active. A failure event may typically be an event that makes the active channel inoperable, such as a cut off of a fiber optic cable over which the active channel is provided. It is appreciated that a backup channel may alternatively backup a plurality of channels (as known in the art under the term of 1:N protection).

The channels 35, 40 and 45 may have different trail lengths due to different lengths of routes used thereby and different communication equipment passed thereby. The different trail lengths typically cause different network delays. The communication equipment passed by the channels 35, 40 and 45 is typically comprised in nodes 48 within the synchronous infrastructure 15 that are passed by the channels 35, 40 and 45. It is appreciated that each of the channels 35, 40 and 45 may be composed of one or more path segments, each spanning between two nodes 48 within the synchronous infrastructure 15, and the number of nodes 48 passed by each of the channels 35, 40 and 45 may vary. Each node 48 typically includes a network element with at least conventional synchronous network functionality.

The term "network delay" is used throughout the specification and claims to refer to a delay imposed on a signal due to its passage in a network. Signals are typically carried over channels, and the channels may have different lengths of routes spanning along different physical distances and passing via different communication equipment. Therefore, different network delays may be associated with different channels, and, for example, a signal carried over a channel may experience a network delay that is different from a network delay experienced by an identical signal carried over another channel.

The channels 35, 40 and 45 eventually terminate at NE 20 and NE 25. For simplicity of the description and without limiting its generality, only the details of NE 20 are shown in FIG. 1.

NE 20 shown in this example includes the following units: a transceiver section 50; a synchronous processor 55; a controller 60; a mapper/demapper unit 65; and an interface section 70. It is appreciated that synchronous processor 55, controller 60 and mapper/demapper unit 65 may be embodied in a single integrated circuit (IC) (not shown).

The interface section 70 in FIG. 1 includes both a media access control (MAC) interface and a physical layer (PHY) interface that enable communication in GBE format with the network terminal associated with NE 20. It is however appreciated that in a case where NE 20 communicates with its associated network terminal in a format other than GBE, the interface section 70 may include interface elements other than the MAC interface and the PHY interface, such interface elements being suitable for communication with the network terminal associated with the NE 20 in the format other than the GBE format.

The transceiver section 50 preferably includes an optical transmitter section and an optical receiver section (both not shown) that may be embodied in separate units or in a combined unit. The optical transmitter section preferably includes an optical transmitter or a plurality of optical transmitters and the optical receiver section preferably includes an optical receiver or a plurality of optical receivers. The transceiver section 50 typically communicates optical signals representing data with transceiver sections (not shown) in nodes 48 in the synchronous infrastructure 15.

Preferably, the optical receiver section in the transceiver section 50 receives from nodes 48 in the synchronous infrastructure 15 optical signals via a plurality of channels including, for example, the VC4 channels 35, 40 and 45. The optical receiver section then provides an electronic representation of the VC4 channels 35, 40 and 45 to the synchronous processor 55 for processing thereby.

The optical transmitter section in the transceiver section 50 preferably receives from the synchronous processor 55 electronic signals representing data carried in a plurality of channels, such as a plurality of VC4 channels. Preferably, the optical transmitter section in the transceiver section 50 converts the electronic signals received thereat from the synchronous processor 55 into optical signals, and transmits the optical signals to the transceiver sections in the nodes 48 in the synchronous infrastructure 15.

The synchronous processor 55 may preferably include a SONET processor or an SDH processor depending respectively on a type of synchronous transmission technology employed in the network 10. Preferably, the synchronous processor 55 includes at least one buffer 75 that receives and arranges electronic signals for processing by synchronous processor 55 and/or for transmitting either to the network terminal associated with NE 20 or to the transceiver sections in nodes 48 in the synchronous infrastructure 15. The at least one buffer 75 is clocked by clock 80, and both clock 80 and the at least one buffer 75, as well as the synchronous processor 55, may preferably be controlled by controller 60, for example, according to management information received from the network management system 30.

When traffic is communicated from NE 20 to the network terminal associated therewith, synchronous processor 55 processes electronic signals representing optical signals received at the optical receiver section of transceiver section 50 thereby generating processed data in a synchronous format. The synchronous processor 55 then outputs the processed data to the mapper/demapper unit 65. The mapper/demapper unit 65 preferably de-maps the data out of the processed data received from synchronous processor 55 into data in a GBE format and provides GBE data to interface section 70. The interface section 70 preferably outputs the GBE data to the network terminal associated with NE 20. It is appreciated that in this example mapper/demapper unit 65 operates under control of the controller 60.

When traffic is communicated from the network terminal associated with NE 20 to NE 20, interface section 70 receives data in a GBE format from the network terminal, and provides the data to the mapper/demapper unit 65. The mapper/demapper unit 65 performs mapping operations on the data so as to map the data into a synchronous format that is carried along a plurality of channels. The data is then carried in a synchronous format along the plurality of channels to synchronous processor 55. In synchronous processor 55, the data is processed and arranged, for example, in VC4 channels, for transmission by the optical transmitter section in transceiver section 50.

Controller 60 together with synchronous processor 55 or mapper/demapper unit 65 preferably form a device in NE 20 that is particularly suitable for enabling dynamic application of changes to a group of virtually concatenated channels carrying communication traffic between NE 20 and NE 25, such as the group of virtually concatenated channels 35, 40 and 45 in which a protection mechanism is enabled. It is appreciated that an apparatus similar to the device in NE 20 may be comprised in NE 25 and in any other NE in the synchronous network 10. It is further appreciated that the apparatus in NE 20 may enable dynamic application of changes to any group of virtually concatenated channels carrying communication traffic between NE 20 and NE 25 without affecting the service provided and regardless of the following: the number of channels in the group; the number of protected channels in the group; and a VC type of the channels in the group.

Referring for example and without limiting the generality of the description to the group of virtually concatenated channels 35, 40 and 45 as the group for which the apparatus in NE 20 enables dynamic application of changes, controller 60 may preferably determine that a change must be applied to the group of virtually concatenated channels 35, 40 and 45 at a specific time. Controller 60 may then control synchronous processor 55 or mapper/demapper unit 65 for distinguishing between a first mode of applying a change to the group of virtually concatenated channels 35, 40 and 45 and a second mode of applying a change to the group.

The major difference between these first and second modes of affecting a change in the group is in the period available/allowed to affect the change. The first mode is applicable for example when a new channel is added to the group in response to the occurrence of a failure event in at least one of the channels of the previously aligned group (e.g. a protecting channel), and this new channel is not aligned with the rest of the group's members. In such a case the addition of the new channel to the group, and the re-alignment of the group (including the new channel) should be affected as soon as possible. On the other hand, by the second mode a new channel is added to the group or a selected channel is removed from the group not in response to occurrence of such a failure event, e.g. in response to a request initiated and transmitted by the network manager to add/remove such a channel. It is appreciated that any channel that is added to the group may preferably include at least one VC.

By the first mode, when a new channel is to be added to the group, synchronous processor 55 or mapper/demapper unit 65 is operative under control of controller 60 to perform time alignment of the new channel and the group without using any pointer justification action regardless of network delays associated with the new channel and the group. A similar action is taken when one (or more) of the channels in a previously aligned group, is out of alignment with the rest of the group's members, e.g. when a failure occurs at the link along which this channel was previously transmitted and only part of the link was replaced by its protecting link. In such a case the delay associated with this channel may be different than the previous delay, and consequently the channel will be out of alignment with the rest of the group.

In the second mode, addition of a new channel to the group, if a network delay associated with the new channel is longer than a network delay associated with the group, is preferably performed by synchronous processor 55 and mapper/demapper unit 65 after achieving time alignment of the new channel and the group by using at least one pointer justification action. Additionally in the second mode, synchronous processor 55 and mapper/demapper unit 65 are preferably operative under control of controller 60 to remove a selected channel from the group and afterwards, if a network delay associated with the group excluding the selected channel is shorter than a network delay associated with the selected channel, synchronous processors 55 should decrease the delay associated with the channels in the group other than the selected channel by using at least one pointer justification action. The effect of this justification action is in reducing and preferably minimizing the data in the buffer, which in turn reduces the delay associated with the remaining channels in the group.

The term "network delay associated with a group of virtually concatenated channels" is used throughout the specification and claims to refer to a sum of a network delay experienced by a channel in the group and a buffer delay experienced by the channel. The term "buffer delay" is used throughout the specification and claims to refer to a delay experienced by a channel due to a channel alignment process that aligns the channel with other channels by performing buffering operations in a buffer, such as the buffer 75, wherein the buffer delay is typically represented by a position in the buffer relative to a first clocked cell of the buffer.

It is appreciated that a network delay associated with a channel that does not form part of the group, such as a channel before it is added by virtual concatenation to the group may be different from the network delay associated with the group. However, once the channel forms part of the group, the channel acquires the network delay of the group.

In the example depicted in FIG. 1, each of channels 35, 40 and 45 preferably carries communication payload that is comprised in the communication traffic communicated between NE 20 and NE 25 and, by way of example, a new channel 85 is to be added to the group of virtually concatenated channels 35, 40 and 45.

In order to determine whether the new channel 85 should be added to the group of virtually concatenated channels 35, 40 and 45 according to the first mode or in accordance with the second mode, the communication traffic carried along the group may be monitored by controller 60 or by network management system 30 to obtain an indication that relates to the operability of at least one channel in the group. This indication may indicate a failure in the communication that is carried over the at least one channel in the group. Such indication may include, for example, a Loss Of Signal ("LOS") indication, an alarm signal etc., and may refer to one channel in the group or to all of the channels in that group.

If the new channel is added to the group due to the occurrence a failure event in at least one of the channels in the group, synchronous processor 55 or mapper/demapper unit 65 is operative, under the control of controller 65, to determine that an upcoming addition of a new channel to the group should be made according to the first mode. Alternatively, synchronous processor 55 or mapper/demapper unit 65 may be operative, under the control of controller 65, to determine that the addition of the new channel to the group should be made according to the first mode if new channel 85 is identified as a backup channel. By still another alternative, synchronous processor 55 or mapper/demapper unit 65 may be operative, under the control of controller 65, to determine that the addition of the new channel to the group should be made according to the first mode if a delay in one or more of the channels of the previously aligned group is detected.

In the case that a new channel is to be added to the group following a management request, synchronous processor 55 or mapper/demapper unit 65 is preferably operative, under control of controller 65, to determine that an upcoming addition of a new channel to the group should be made according to the second mode.

If new channel 85 is to be added to the group of virtually concatenated channels 35, 40 and 45 according to the first mode in order to protect the communication payload carried along channel 45 when a failure event occurs in channel 45, the synchronous processor 55 or the mapper/demapper unit 65, operating under control of controller 60 preferably will execute a hit process to achieve time alignment of the new channel 85 and the group of virtually concatenated channels 35, 40 and to enable addition of the new channel 85 to the group.

The term "hit process" as referred to a group of virtually concatenated channels is used herein to denote a process by which transmission of the communication payload over all the channels of the group is interrupted until the group is rearranged and time realigned e.g. in response to the occurrence of failure event in at least one of the channels or in response to a delay detected in at least one of the channels belonging to the group. The hit process is therefore a process that typically affects service because transmission of communication payload is interrupted until the change is completed. For example, if a protecting channel is to be added to the group in order to replace a failing protected channel, transmission of the communication payload along all remaining group's channels is interrupted until all the traffic carrying channels of the group, including the new (protecting) channel, are time realigned. After these channels are time realigned, transmission of the communication payload may be resumed along all the active channels of the group.

It should be appreciated that a hit process may also be performed on a group that includes a single channel, in which case transmission of communication payload along the single channel is interrupted until a change is implemented in the single channel.

If the new channel 85 is to be added to the group of virtually concatenated channels 35, 40 and 45 according to the second mode, i.e. as an additional channel rather than as channel protecting the communication payload carried along channel 45, synchronous processor 55 or mapper/demapper unit 65, operating under control of controller 60 may be operative to employ techniques as mentioned in Applicant's co-pending Israeli Patent Application No. 149,323, the disclosure of which is incorporated herein by reference, to enable addition of new channel 85 to the group. The techniques mentioned in IL 149,323 enable, in many cases, addition of the new channel 85 to the group without service affecting.

For example, if a network delay associated with new channel 85 is longer than a network delay associated with the group of virtually concatenated channels 35, 40 and 45, the synchronous processor 55 may preferably execute a gradual time alignment process rather than a hit process in order to achieve time alignment of new channel 85 and the group and thereby enable addition of the new channel 85 to the group. The term "gradual time alignment process" is used throughout the specification and claims to include a process that uses at least one pointer justification action. It is appreciated that the service is typically not affected during application of the gradual time alignment process.

In the case where the network delay associated with the new channel 85 is longer than the network delay associated with the group, execution of the gradual time alignment process involves performance of at least one positive pointer justification action and preferably a plurality of consecutive positive pointer justification actions that are performed by the synchronous processor 55 or the mapper/demapper unit 65 until the new channel 85 and the group are aligned as described in IL 149,323.

If the network delay associated with the new channel 85 is shorter than the network delay associated with the group of virtually concatenated channels 35, 40 and 45, time alignment of the new channel 85 and the group may be achieved by the synchronous processor 55 or the mapper/demapper unit 65 using either at least one pointer justification action or a direct delay action as described in IL 149,323.

It is appreciated that removal of a channel from the group of virtually concatenated channels 35, 40 and 45 does not require interruption of transmission of communication payload over all the channels in the group. Therefore, if a channel, for example the channel 45, is to be removed from the group, controller 60 preferably determines that the second mode of changing the group must be applied. In such a case, synchronous processor 55 or mapper/demapper unit

65, operating under control of controller 60 preferably removes the channel 45 from the group.

After removal of channel 45 from the group, if a network delay associated with the group excluding the channel 45 is shorter than a network delay associated with channel 45, synchronous processor 55 or mapper/demapper unit 65 preferably executes a gradual time alignment process in which at least one negative pointer justification action is applied on the group excluding channel 45. The at least one negative pointer justification action may preferably include a plurality of consecutive negative pointer justification actions that are performed by synchronous processor 55 or mapper/demapper unit 65 until the network delay associated with the group excluding channel 45 is minimized. The network delay associated with the group excluding channel 45 may therefore be minimized without affecting the service.

It should be appreciated that the ability to distinguish between the first mode of aligning the group and the second mode of aligning the group by applying different time alignment methods provides a better implementation of applying dynamic changes to a group of virtually concatenated channels because not every change to the group must result in execution of a hit process that interrupts communication service.

Figure 2:
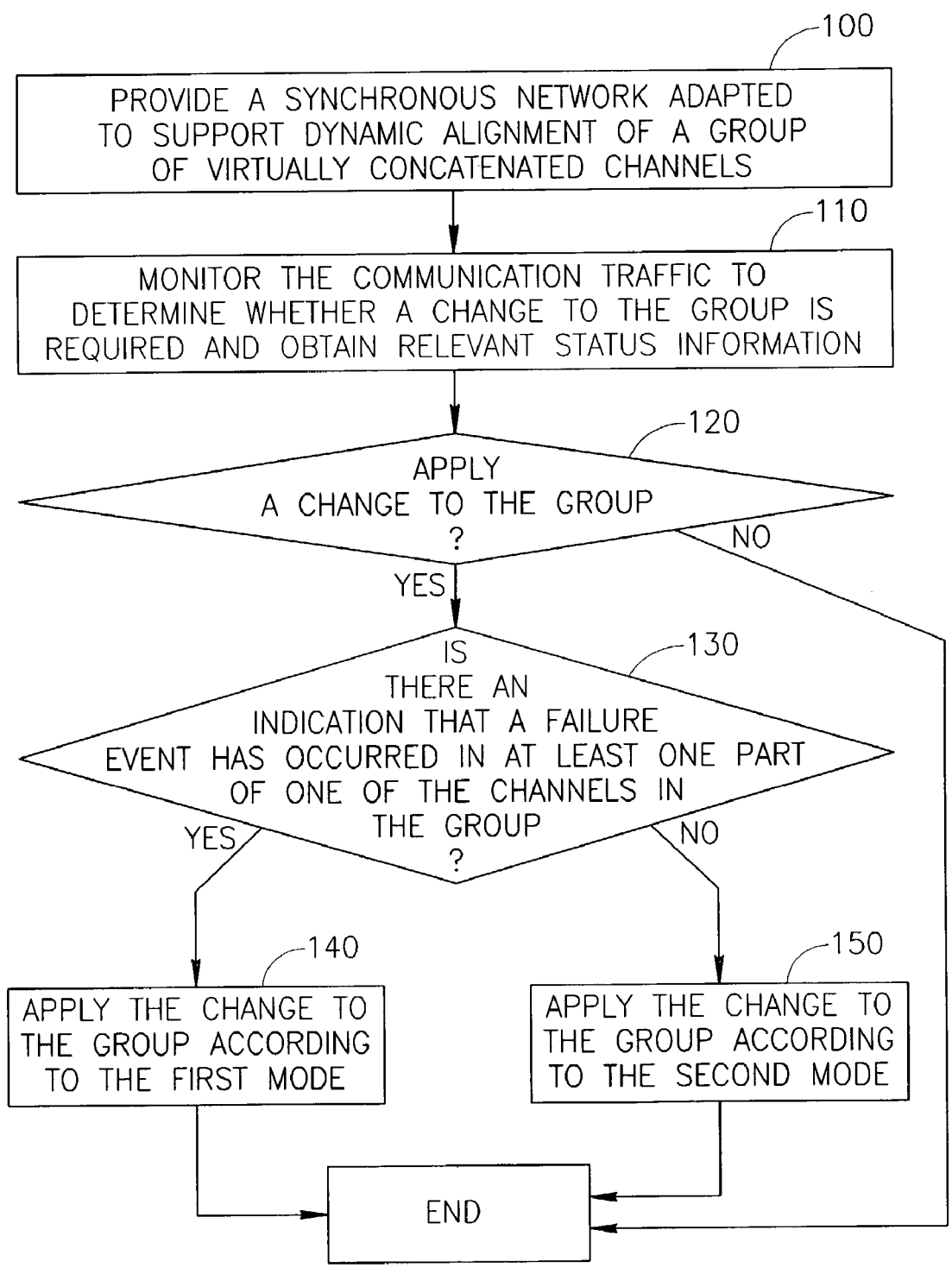
FIG. 2 is a simplified flowchart illustration of a preferred method of operation of the network of FIG. 1.

Reference is now made to FIG. 2, which is a simplified flowchart illustration of a preferred method of operation of network 10 of FIG. 1.

In this example, a synchronous network which is adapted to support dynamic application of changes to a group of virtually concatenated channels carrying communication traffic between a first NE and a second NE of the synchronous network, is provided (step 100). The communication traffic carried between the first NE and the second NE is monitored to determine whether a change to the group is required and to further obtain an indication (e.g. status indication) that refers to at least one channel in the group (step 110).

The indication enables to determine a required mode of changing the group out of two modes of changing the group in which the first mode of changing the group is distinguished from the second mode of changing the group in that in the first mode a new channel is added to the group in response to occurrence of a failure event in at least one part of one of the channels in the group, whereas in the second mode a new channel is added to be added to the group or a selected channel is to be removed from the group not in response to occurrence of such a failure event but in response to a system management request.

The first mode is characterized in that a new channel that is added to the group is added in order to protect the communication payload carried along the at least one of the channels in the group in which the failure occurred, and time alignment of the new channel and the group is performed without using any pointer justification action regardless of network delays associated with the new channel and the group. Preferably, the time alignment of the new channel and the group is performed within a hit process.

The second mode is characterized in that addition of a new channel to the group, if a network delay associated with the new channel is longer than a network delay associated with the group, is performed after achieving time alignment of the new channel and the group by using at least one pointer justification action, and removal of a selected channel from the group, if a network delay associated with the group excluding the selected channel is shorter than a network delay associated with the selected channel, is followed by performance of time alignment of channels in the group other than the selected channel by using at least one pointer justification action.

The at least one pointer justification action used in the second mode preferably includes at least one positive pointer justification action in a case where a new channel is added to the group and a network delay associated with the new channel is longer than a network delay associated with the group, and at least one negative pointer justification action in a case where a selected channel is removed from the group and a network delay associated with the group excluding the selected channel is shorter than a network delay associated with the selected channel. Preferably, the at least one positive pointer justification action may include a plurality of consecutive positive pointer justification actions that are performed until the new channel and the group are aligned, and the at least one negative pointer justification action may include a plurality of consecutive negative pointer justification actions that are performed until the network delay associated with the group excluding the selected channel is minimized.

If application of a change to the group is required (step 120) and there is an indication that a failure event occurred in at least a part of one of the channels in the group (step 130) (e.g. by establishing that one of the channels of the group is not aligned anymore with the remaining channels, by detecting a LOS, etc.), the change is applied to the group according to the first mode (step 140). Otherwise, the change is applied to the group according to the second mode (step 150). In addition or in the alternative, the determination made in accordance with step 130 comprises determining whether the change should be made in response to a management request to increase/decrease the number of channels associated with that group. If the determination is affirmative, i.e. that the change results from such a request, that the change should be applied to the group in accordance with the second mode.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. A method for enabling communication between a first network element (NE) and a second NE of a synchronous network which is adapted to support dynamic application of changes to an aligned group of virtually concatenated channels carrying communication traffic between said first NE and said second NE, the method comprising:

distinguishing between a first mode of time aligning said group of virtually concatenated channels following the addition of a new channel to said group in response to a failure event occurring in at least one of the channels belonging to said group, or following a detection that at least one of the previously aligned channels is not aligned with the remaining channels of the group and a second mode of time aligning said group when a new channel is added to the group or a selected channel is removed from the group in response to a request transmitted by a managing element, wherein in said first mode, the time alignment is performed without using any pointer justification action regardless of network delays associated with said group's channels, and in the second mode, if a network delay associated with a new channel to be added to said group of virtually concatenated channels is longer than a network delay associated with said group, the time alignment of the new channel and the group is achieved by using at least one pointer justification action.

2. A method according to claim 1, and wherein if a network delay associated with a channel selected to be removed from said group of virtually concatenated channels is longer than a network delay associated with said group excluding the selected channel, the time alignment of the channels in the group other than the selected channel is carried out by using at least one pointer justification action.

3. The method according to claim 1 and wherein said distinguishing step comprises:

monitoring said communication traffic carried to along said group to obtain an indication that refers to the operability status of at least one channel in the group; and determining the mode of time alignment to be carried based on information retrieved from said indication.

4. The method according to claim 1 and wherein said distinguishing step comprises:

monitoring said communication traffic carried along said group to obtain a request from a managing element that refers to an addition or a removal of at least one channel to or from said group of virtually concatenated channels.

5. The method according to claim 3 and wherein said indication comprises at least one alarm signal.

6. The method according to claim 1 and wherein said distinguishing step comprises the step of determining that addition of a new channel to the group is made according to the first mode if the new channel comprises a backup channel.

7. The method according to claim 1 and wherein in the first mode, the at least one of the channels in the group in which said failure event occurs, carries communication payload comprised in said communication traffic.

8. The method according to claim 7 and wherein in the first mode the new channel is added to the group in order to protect said communication payload carried along said at least one of the channels in the group.

9. The method according to claim 1 and wherein in the second mode, the at least one pointer justification action used before addition of a new channel to the group if a network delay associated with the new channel is longer than a network delay associated with the group, comprises at least one positive pointer justification action.

10. The method according to claim 1 and wherein in the second mode, the at least one pointer justification action used following removal of a selected channel from the group if a network delay associated with the group excluding the selected channel is shorter than a network delay associated with the selected channel, comprises at least one negative pointer justification action.

11. The method according to claim 1 and wherein said synchronous network comprises at least one of the following: a network based at least partially on the Synchronous Optical Network (SONET); and a network based at least partially on the Synchronous Digital Hierarchy (SDH).

12. An apparatus for enabling communication between a first network element (NE) and a second NE of a synchronous network which is adapted to support dynamic application of changes to an aligned group of virtually concatenated channels carrying communication traffic between said first NE and said second NE, the apparatus comprising:

a synchronous processor operative to receive said communication traffic carried along said group of virtually concatenated channels; and a controller operatively associated with the synchronous processor and operative to control said synchronous processor for distinguishing between a first mode of changing the group in which a new channel is added to the group in response to occurrence of a failure event in at least one of the channels in the group, and a second mode of changing the group in which a new channel is added to the group or a selected channel is removed from the group not in response to occurrence of such a failure event, wherein in said first mode, the synchronous processor is operative under control of the controller to perform time alignment of the new channel and the group without using any pointer justification action regardless of network delays associated with the new channel and the group, and in the second mode, if a network delay associated with a new channel to be added to the group of virtually concatenated channels is longer than a network delay associated with said group, the addition of the new channel to the group is performed by the synchronous processor after time aligning the new channel and the group by using at least one pointer justification action.

13. An apparatus according to claim 12, wherein in the second mode, if a network delay associated with a channel selected to be removed from said group of virtually concatenated channels is longer than a network delay associated with said group excluding the selected channel, the removal of the selected channel from the group is performed by the synchronous processor by using at least one pointer justification action.

14. An apparatus according to claim 12, wherein in the first mode, said synchronous processor is operative under control of said controller to perform a hit process to achieve time alignment of the new channel and the group.

15. An apparatus according to claim 12, and said controller is operative to distinguish between the two modes of operation by monitoring the communication traffic carried along said group to obtain an indication that refers to the operability status of at least one channel in the group, and determining the mode of time alignment to be carried based on information retrieved from said indication.

16. An apparatus for enabling communication between a first network element (NE) and a second NE of a synchronous network which is adapted to support dynamic application of changes to a group of virtually concatenated channels carrying communication traffic between the first NE and the second NE, the apparatus comprising:

a mapper/demapper unit operative to receive said communication traffic carried along said group of virtually concatenated channels; and a controller operatively associated with the mapper/demapper unit and operative to control said mapper/demapper unit for distinguishing between a first mode of changing the group in which a new channel is added to the group in response to occurrence of a failure event in at least one of the channels in the group, and a second mode of changing the group in which a new channel is added to the group or a selected channel is removed from the group not in response to occurrence of such a failure event, wherein
in the first mode, when a new channel is to be added to the group, the mapper/demapper unit is operative under control of the controller to perform time alignment of the new channel and the group without using any pointer justification action regardless of network delays associated with the new channel and the group, and
in the second mode, addition of a new channel to the group, if a network delay associated with the new channel is longer than a network delay associated with the group, is performed by the mapper/demapper unit after achieving time alignment of the new channel and the group by using at least one pointer justification action, and removal of a selected channel from the group, if a network delay associated with the group excluding the selected channel is shorter than a network delay associated with the selected channel, is followed by performance by the mapper/demapper unit of time alignment of channels in the group other than the selected channel by using at least one pointer justification action.

17. An apparatus according to claim 16, wherein in the first mode, said mapper/demapper unit is operative under control of said controller to perform a hit process to achieve time alignment of the new channel and the group.

* * * * *